United States Patent [19]

Chuang

[11] Patent Number: 5,547,365
[45] Date of Patent: Aug. 20, 1996

[54] FAN BLADE MOLD

[76] Inventor: Wen-Hao Chuang, No. 236, Ching Hua St., San Min Dist., Kaohsiung, Taiwan

[21] Appl. No.: 405,822

[22] Filed: Mar. 17, 1995

[51] Int. Cl.⁶ .................................................. B29C 45/36
[52] U.S. Cl. .................... 425/577; 249/67; 249/142; 249/155; 264/328.100; 425/444; 425/468; 425/556
[58] Field of Search ..................... 425/556, 577, 425/444, 468; 249/59, 67, 68, 142, 155; 264/275, 328.1

[56] References Cited

U.S. PATENT DOCUMENTS

| | | | |
|---|---|---|---|
| 3,136,001 | 6/1964 | Gelbard | 249/155 |
| 3,756,553 | 9/1973 | Ranz | 249/142 |
| 4,047,692 | 9/1977 | Swin, Sr. | 249/155 |
| 4,107,257 | 8/1978 | Swin, Sr. | 264/275 |
| 4,975,041 | 12/1990 | Fries et al. | 249/142 |

*Primary Examiner*—Jay H. Woo
*Assistant Examiner*—Joseph Leyson
*Attorney, Agent, or Firm*—Varndell Legal Group

[57] ABSTRACT

A fan blade mold is disclosed having a center shaft molding unit and a blade molding unit disposed around the center shaft molding unit and defining with the fan blade mold a plurality of blade molding cavities around the center shaft molding unit for molding the blades of the fan blade, the center shaft molding unit having a longitudinal center cavity for molding the center shaft of the integral fan blade to be molded, a plurality of knock-out pins spaced around the center cavity for knocking out the fan blade and for molding a respective circular dent on a hub of the fan blade, and a reference line raised from the top side and aligned with one lateral side of one blade molding cavity, the knock-out pins being respectively disposed at the radial lines which pass through the point at ⅓ of the radial width of each blade molding cavity measured from the left lateral side of each blade molding cavity. The center shaft molding unit can be turned relative to the blade molding unit to shift the reference line and the lengths of the knock-out pins can be modified to adjust the balance of the fan blade.

1 Claim, 4 Drawing Sheets

FAN BLADE MOLD

BACKGROUND OF THE INVENTION

The present invention relates to fan blade molds, and relates more particularly to such a fan blade mold which can be conveniently adjusted to correct the balance of the fan blade to be molded.

Regular electric cooling fans for use with personal computers and other electronic apparatus are commonly comprised of an integral fan blade molded from plastics (see FIG. 1). If the fan blade is not balanced after its installed (see FIG. 2), it will cause noises. Various reasons will cause the fan blade to be unbalanced. These reasons include uneven material specific gravity, displacement of the fan blade metal shaft, deformation of the fan blade caused by heat and/or other factors, wearing of the fan blade mold, etc. Because the fan blade mold commonly uses two knock-out pins to knock out the fan blade when the fan blade is molded, the blades of the fan blade tend to be deformed when knocked out by the knock-out pins. Furthermore, because the shaft of the fan blade is made from metal, it must be installed in the mold during the molding of the fan blade so that the fan blade can be directly molded on the shaft. This procedure greatly complicates the production of the fan blade and increases its manufacturing cost. If the metal shaft is not accurately set in position, the fan blade will lose its balance when installed. If the unbalanced problem occurs, the fan blade mold must be modified. However, the procedure of modifying the fan blade mold is complicated and costly.

SUMMARY OF THE INVENTION

The present invention has been accomplished to provide a fan blade mold which eliminates the aforesaid problems.

According to one aspect of the present invention, the fan blade mold is comprised of a center shaft molding unit having a longitudinal center cavity for molding the shaft of the fan blade, and a blade molding unit disposed around the center shaft molding unit and defining with the fan blade mold a plurality of blade molding cavities for molding the blades on the shaft of the fan blade. Because the blades and the shaft are integrally molded together at the same time, the manufacturing process of the fan blade is simplified, and therefore the manufacturing cost of the fan blade is relatively reduced.

According to another aspect of the present invention, the center shaft molding unit has a plurality of knock-out pins spaced around the center cavity for knocking out the fan blade and for molding a respective circular dent on the hub of the fan blade, and a reference line raised from the top side and aligned with one lateral side of one blade molding cavity. The knock-out pins are respectively disposed at the radial lines which pass through the point at ⅓ of the radial width of each blade molding cavity measured from the left lateral side of each blade molding cavity. The number of the knock-out pins is equal to the number of the blade molding cavities, therefore outward pressure can be evenly applied to the molded fan blade when to moving the molded fan blade out of the mold. The center shaft molding unit can be turned relative to the blade molding unit to shift the reference line and the lengths of the knock-out pins can be modified to adjust the balance of the fan blade to be molded.

DETAILED DESCRIPTION OF THE PREFERRED EMBODIMENT

Figure 3:
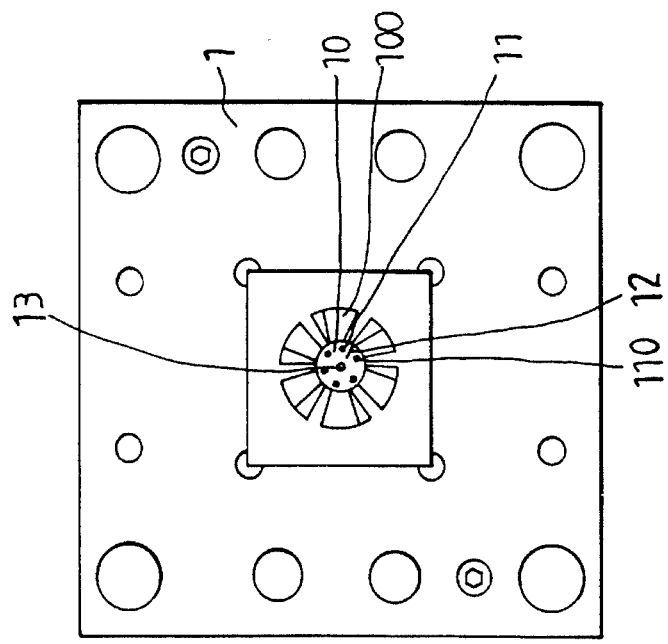
FIG. 3 is a top view of a fan blade mold according to the present invention.
Figure 2:
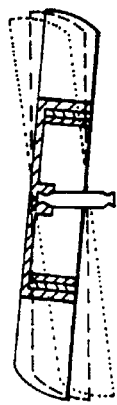
FIG. 2 shows the fan blade of FIG. 1 oscillated when turned.
Figure 1:
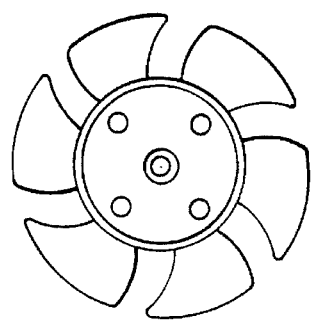
FIG. 1 is a front view of a conventional fan blade made by a fan blade mold according to the prior art.
Figure 5:
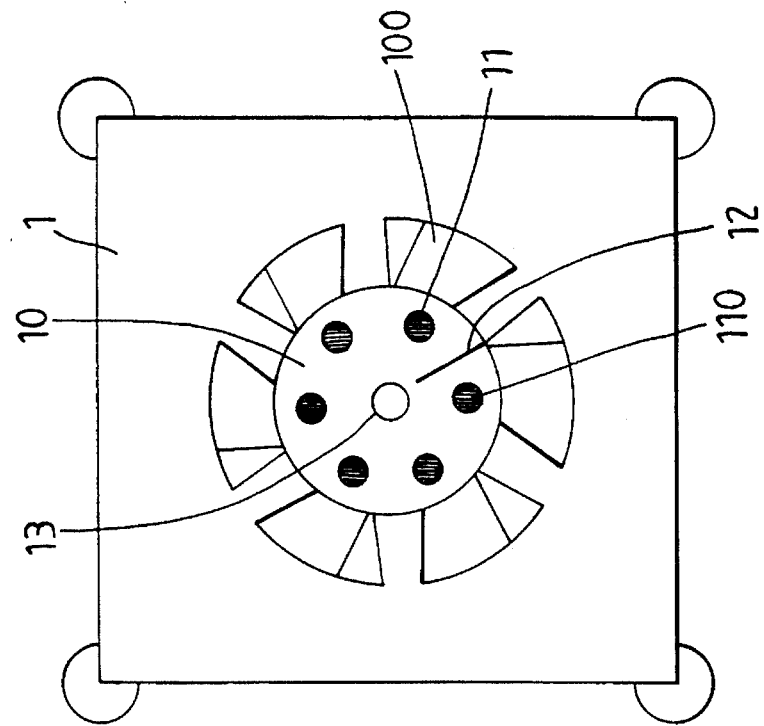
FIG. 5 is an enlarged view of the center part of the fan blade mold shown in FIG. 3.
Figure 4:
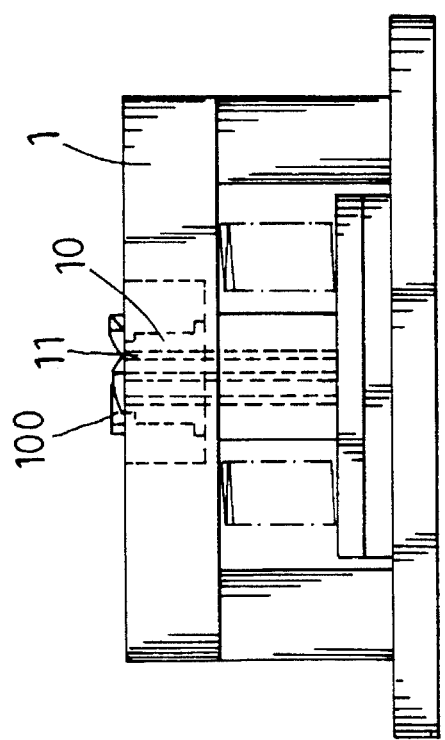
FIG. 4 is a front side view of the fan blade mold shown in FIG. 3.

Referring to FIGS. 3, 4, 5, and 9, the fan blade mold, referenced by 1, comprises a center shaft molding unit 10 and a blade molding unit 14 around the center shaft molding unit 10. The center shaft molding unit 10 has a longitudinal center cavity 13 for molding the center shaft (stator) 21 (see also FIG. 6). The blade molding unit 14 defines with the fan blade mold 1 a plurality of blade molding cavities 100 around the center shaft molding unit 10 for molding the blades 3 (see also FIG. 6). The center shaft molding unit 10 has a plurality of knock-out pins 11 and 110 spaced around the center cavity 13 for knocking out the fan blade when molded, and a radial reference line 12 raised from the top of the center shaft molding unit 10 and aligned with one lateral side of one blade molding cavity 100. The number of the knock-out pins 11 and 110 is equal to that of the blade molding cavities 100. The knock-out pins 11 and 110 are respectively disposed at the radial lines which pass through the point at ⅓ of the radial width of each blade molding cavity 100 measured from the left lateral side of each blade molding cavity 100. The location of the reference line 12 is corresponding to the gravity center of the molded fan blade 3.

Figure 8:
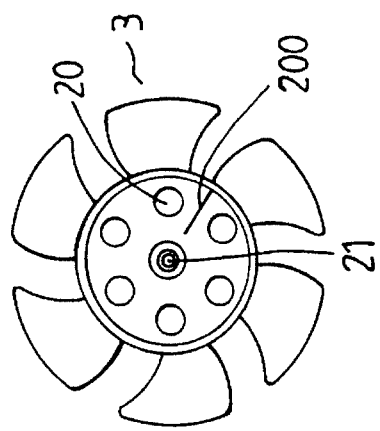
FIG. 8 is a front view of the fan blade shown in FIG. 6.
Figure 7:
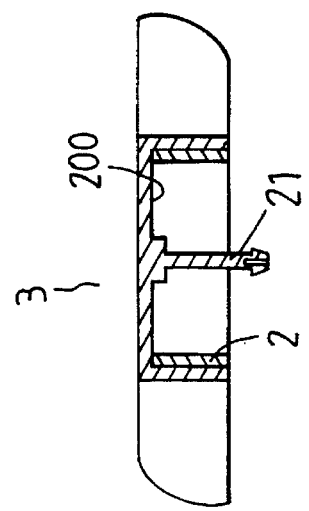
FIG. 7 is a sectional side view of the fan blade shown in FIG. 6.
Figure 6:
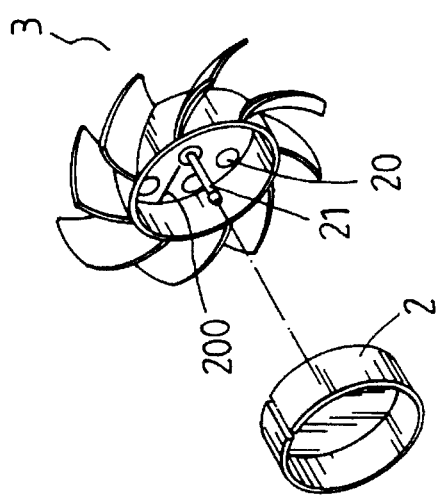
FIG. 6 shows the structure of a fan blade made according to the present invention.
Figure 10:
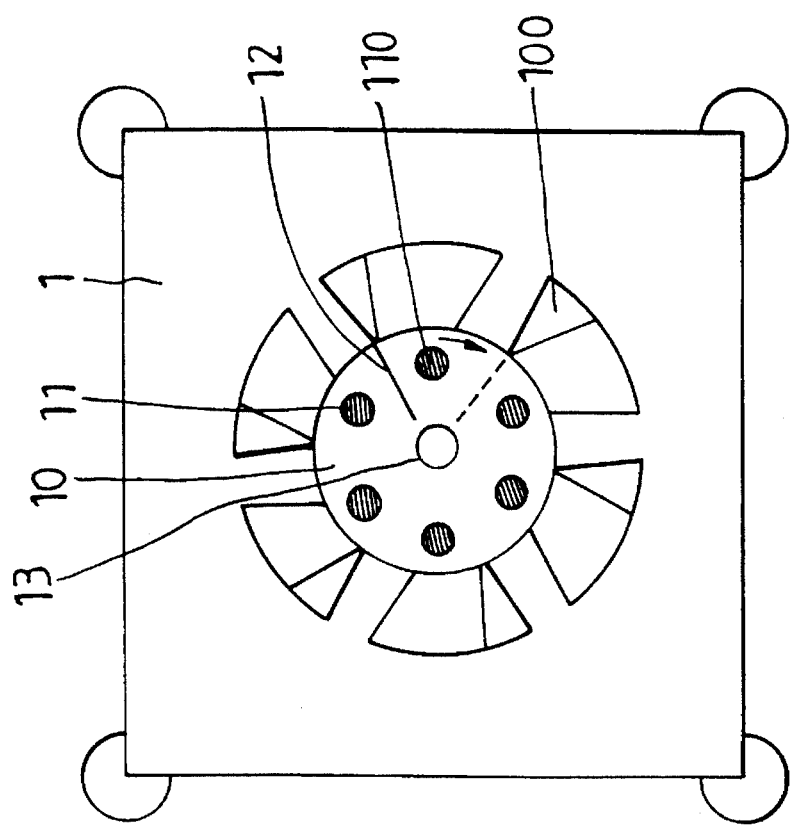
FIG. 10 shows the center shaft molding unit turned relative to the blade molding unit and the reference line shifted according to the present invention.
Figure 9:
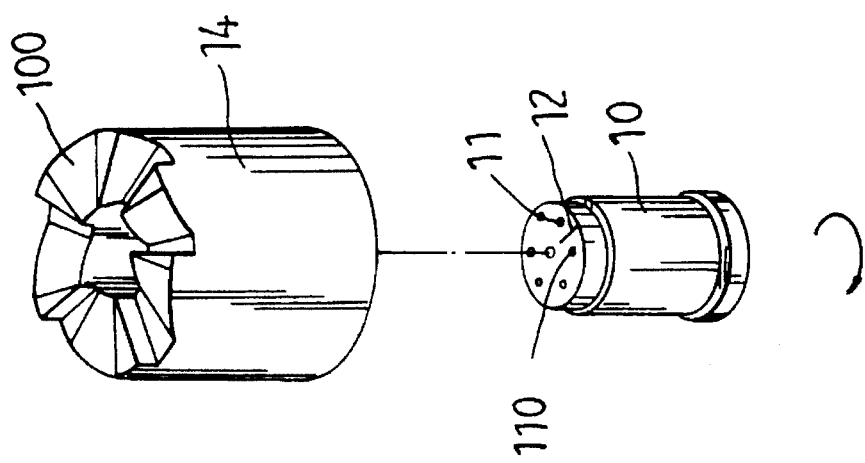
FIG. 9 is an exploded view of the center shaft molding unit and the blade molding unit for the fan blade mold shown in FIG. 3.

Referring to FIGS. 6, 7, and 8, when the fan blade 3 is molded, it is knocked out by the knock-out pins 11. The finished fan blade 3 has a recessed reference line 200 and a plurality of rounded dents 20 on the inside wall of the hub corresponding to the knock-out pins 11 and the reference line 12 on the fan blade mold 1. By means of the reference line 200, the magnetic ring 2 can be accurately fastened to the fan blade 3. If any blade of the fan blade 3 is unbalanced, the corresponding knock-out pin 11 is processed to change its length. When the length of one knock-out pin 11 is changed, the depth of the corresponding rounded dent 20 is relatively changed, and therefore the balance of the corresponding blade of the fan blade 3 is relatively adjusted. If the balance of the blades of the fan blade 3 is worse, the center shaft molding unit 10 is turned relative to the blade molding unit 14 to shift the reference line 12 (see FIG. 10), and therefore the unbalance condition can be corrected.

I claim:

1. A fan blade mold apparatus comprising a fan blade mold, a center shaft molding unit having a longitudinal center cavity for molding a center shaft of an integral fan blade to be molded, and a blade molding unit defining with the fan blade mold a plurality of blade molding cavities around said center shaft molding unit for molding the blades on the center shaft of the integral fan blade, wherein said center shaft molding unit comprises a plurality of knock-out pins spaced around said center cavity for knocking out the fan blade to be molded and for molding a respective circular dent on a hub of the fan blade to be molded, and a reference line raised from a top side thereof and aligned with one lateral side of one blade molding cavity, said knock-out pins being respectively disposed at radial lines which pass through a point at ⅓ of the radial width of each blade molding cavity measured from the left lateral side of each blade molding cavity, said apparatus further comprising means for adjusting the balance of the fan blade comprising means for turning the center shaft molding unit relative to the blade molding unit and means for adjusting the lengths of the knock-out pins.

* * * * *